US011992750B2

(12) United States Patent
Smith et al.

(10) Patent No.: US 11,992,750 B2
(45) Date of Patent: May 28, 2024

(54) BLACKJACK VARIATION

(76) Inventors: Ray Smith, Linden, NJ (US); Amanda Tears Smith, Linden, NJ (US)

( * ) Notice: Subject to any disclaimer, the term of this patent is extended or adjusted under 35 U.S.C. 154(b) by 2935 days.

(21) Appl. No.: 12/912,410

(22) Filed: Oct. 26, 2010

(65) Prior Publication Data

US 2012/0098197 A1 Apr. 26, 2012

(51) Int. Cl.

| | |
|---|---|
| ***A63F 1/00*** | (2006.01) |
| ***A63F 3/00*** | (2006.01) |
| ***G07F 17/32*** | (2006.01) |

(52) U.S. Cl.

CPC ............ *A63F 1/00* (2013.01); *A63F 3/00157* (2013.01); *G07F 17/3293* (2013.01); *A63F 2001/003* (2013.01)

(58) Field of Classification Search

CPC .. A63F 1/00; A63F 3/00157; A63F 2001/003; G07F 17/3293

USPC ............................ 273/292, 274, 309; 463/12

See application file for complete search history.

(56) References Cited

U.S. PATENT DOCUMENTS

| | | | | |
|---|---|---|---|---|
| 5,368,305 | A * | 11/1994 | Rodda et al. | 273/292 |
| 5,632,486 | A * | 5/1997 | Mkrtchyan | 273/292 |
| 6,065,753 | A * | 5/2000 | Morosky | 273/292 |
| 7,575,236 | B1 | 8/2009 | Haber | |
| 2010/0213671 | A1 * | 8/2010 | Ko | A63F 3/00157 273/292 |

* cited by examiner

*Primary Examiner* — Michael D Dennis

(74) *Attorney, Agent, or Firm* — MARK A. LITMAN & ASSOCIATES, P.A.

(57) ABSTRACT

A method of conducting a wagering game is practiced comprising: a) providing at least one deck of i) physical playing cards or ii) virtual playing cards provided by a processor to a video display screen; b) accepting at least one first wager; c) dealing only two cards to each designated player and two cards to the dealer; d) determining in any hand has a Natural 0 count; e) resolving any player versus dealer wagers between each individual player hand that has a Natural 0 count; f) the dealer allowing each player electing to take a maximum of one additional card or standing pat; g) the dealer remaining pat within a first certain predetermined total counts; h) after all possible additional cards have been dealt, resolving the wagers based on whether the designated player's hand or the dealer's hand is nearest to a value of 0.

2 Claims, 3 Drawing Sheets

FIG. 1
DEALER'S CARDS
PLAYER'S CARDS
POWER MATCH
ASIAN BJ

FIG. 2

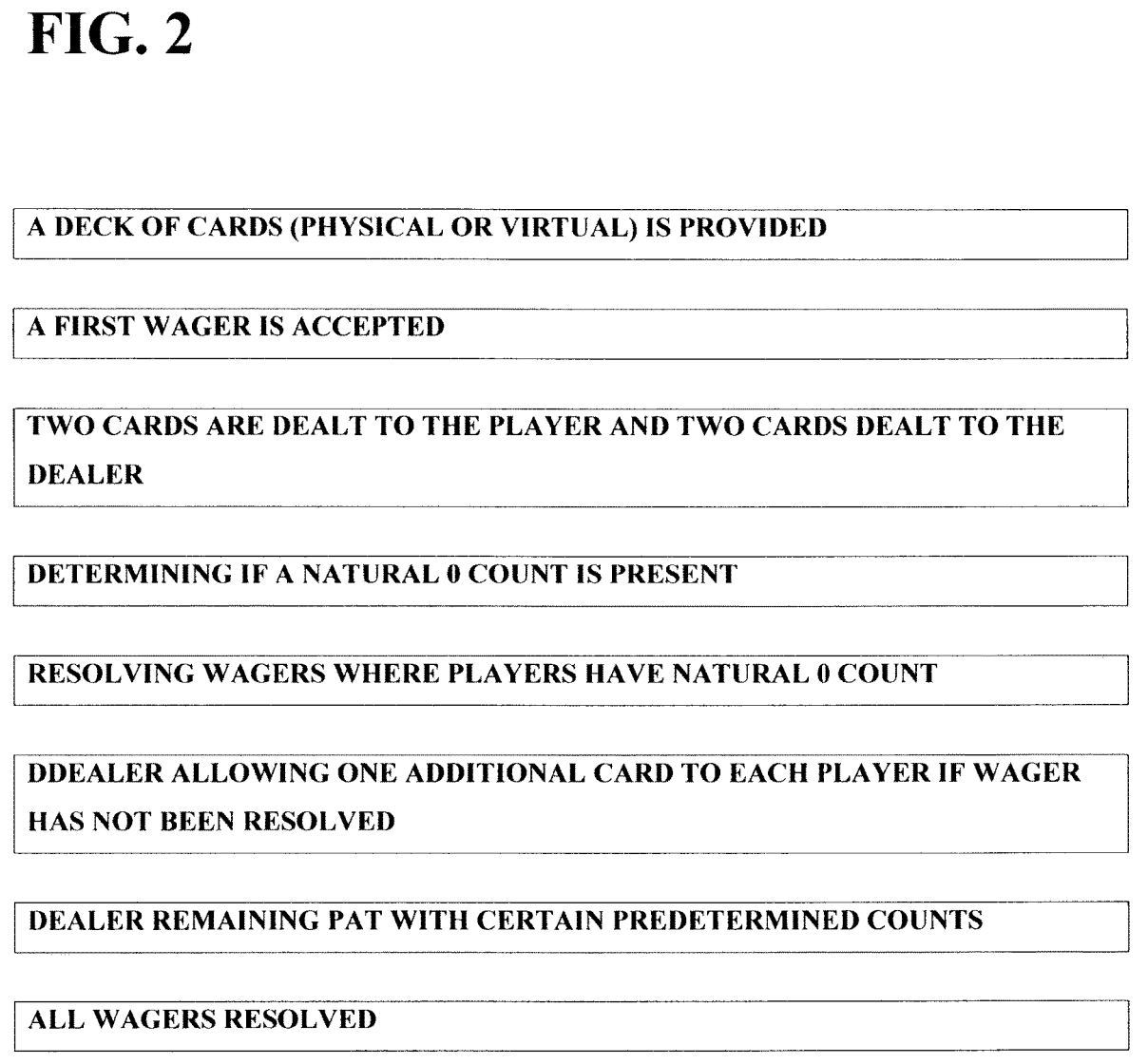

A DECK OF CARDS (PHYSICAL OR VIRTUAL) IS PROVIDED

A FIRST WAGER IS ACCEPTED

TWO CARDS ARE DEALT TO THE PLAYER AND TWO CARDS DEALT TO THE DEALER

DETERMINING IF A NATURAL 0 COUNT IS PRESENT

RESOLVING WAGERS WHERE PLAYERS HAVE NATURAL 0 COUNT

DDEALER ALLOWING ONE ADDITIONAL CARD TO EACH PLAYER IF WAGER HAS NOT BEEN RESOLVED

DEALER REMAINING PAT WITH CERTAIN PREDETERMINED COUNTS

ALL WAGERS RESOLVED

BLACKJACK VARIATION

BACKGROUND OF THE INVENTION

1. Field of the Invention

The present invention relates to a wagering game utilizing real or virtual standard playing cards. More particularly, the embodiments relate to a card game involving a comparison of hand totals, each player against a dealer.

2. Background

Legalized gaming is a major industry in the United States and worldwide. Accordingly, casinos are in constant need of new games of chance to retain and attract patrons. The existing games of chance, such as blackjack, Caribbean Stud™ Poker, Four Card Poker™ games, Three-Card Poker™ games, Baccarat, Roulette Casino War, Pai Gow and Craps remain popular but players need new games of chance to maintain their interest. Moreover, the existing games of chance suffer from drawbacks.

For example, Baccarat includes complicated rules and a commission on winning wagers, Casino War is a non-exciting game having a large house edge.

U.S. Pat. No. 7,575,236 (Haber) attempts to meets these needs with a baccarat variant of a method of conducting a wagering game comprising by: providing one or more decks of cards; accepting wagers from each participating player on only one of two hands, a designated player's hand or a banker's/dealer's hand; dealing only two hands by providing two or more cards to the designated player and the banker/dealer such that the designated player and the banker/dealer receive the same number of cards; comparing a value of the designated player's hand to a value of the banker's/dealer's hand wherein said value of the designated player's hand and the banker's/dealer's hand is in a range of zero to nine points based on a pre-established scoring system wherein aces count as one point, tens and face cards count as zero points and all other cards count as their face value and wherein a two-digit hand total is deemed to have a value corresponding to the one's digit of the two-digit total; resolving the wagers based on whether the designated player's hand or the banker's/dealer's hand is nearest to a value of nine; and responsive to a tie between the designated player's hand and the banker's/dealer's hand, requiring all players to pay a commission based on wager amounts on the designated player's hand or the banker's/dealer's hand.

Thus, there continues to a need for a new game of chance that is easy to learn and play, involves an acceptable house edge and does not incorporate commissions on winning wagers.

SUMMARY OF THE INVENTION

Accordingly, a first embodiment of the present invention is a method of conducting a wagering game comprising: accepting wagers on a designated player's hand against a dealer hand in an initial blackjack format; providing an initial two cards to the designated player and the dealer such that the designated player and the dealer receive the same number of cards; receiving a maximum of one more playing card per hand (according to player election and dealer's requirements); comparing a value of the designated player's hand to a value of the dealer's hand; wherein said value of the designated player's hand and the dealer's hand is in a range of zero to nine points based on a pre-established scoring system wherein aces count as one point, tens and face cards count as zero points and all other cards count as their face value; and wherein a two-digit hand total is deemed to have a value corresponding to the one's digit of the two-digit total; resolving the wagers based on whether the designated player's hand or the dealer's hand is nearest to a value of zero (0).

In one optional embodiment, players may place wagers on a player's hand and a tie outcome, akin to a Baccarat game (preferably on only the first two cards, but not the final hands). After the initial wager, the player and the dealer are each dealt two cards. The winning hand is the two-card hand having a total value nearest to zero (initially if no player or dealer takes the maximum of one additional card, or at the conclusion of all players and the dealer exercising or declining their option of receiving the at most one additional card. Should the player's hand and dealer's hand result in a tie, any tie wagers are paid and wagers on the player's hand and the dealer's hand are a push, with the wager remaining in the player's control.

Other variations, embodiments and features of the present invention will become evident from the following detailed description, drawings and claims.

BRIEF DESCRIPTION OF THE DRAWINGS

FIG. 2 shows a flow chart detailing play of the first embodiment of the present invention.

DETAILED DESCRIPTION

Figure 1:
FIG. 1 shows a top view of a gaming table top of one embodiment of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The general concepts disclosed herein, within in there are many variations and alternatives available in the play of the game, shall be discussed under the generic name of Pacific Rim Blackjack.

Reference is now made to the figures wherein like parts are referred to by like numerals throughout. FIG. 1 illustrates one embodiment of a gaming table top of the present invention generally referred to by reference numeral 100. The gaming table top 100 comprises six player positions 110-1 through 110-6 and a dealer position 115. Each player position 110-1 through 110-6 includes a player wager area 120, player wager area 130, an optional tie wager area 140 and optionally a payout listing 150. As shown the payout listing 150 depicts a 1 to 1 payout on winning wagers on player's hands and dealer's hands, an optional 8 to 1 on winning tie wagers. The table shoes a playing card providing shoe or shuffler 170. The table also supports a chip tray 180 and game display 190.

A flow chart 200 shown in FIG. 2 details a method of play according to a first embodiment of the present invention. A game begins with each player wagering on a designated player's hand 210 by placing a wager in the player wager area 120. The players (in an optional game variant) may also place a wager on a tie outcome by placing a wager in the tie wager area 140. The dealer (or a player or banker) then deals a designated player two cards and the dealer two cards 220 by dealing a first card from the card shoe or shuffler 170 to the player, a second card to the dealer, a third card to the player and a fourth card to the dealer. It I possible to deal two cards at a time to each player and dealer. Alternative deal arrangements may be used as well. One to eight decks (or continuous supplies from a continuous shuffler) may be used to facilitate the embodiments of the present invention. The two-card, player's hand and dealer's hand are then compared to one another 230. The comparison is based on a single digit value of each hand between 0 and 9, and also on rankings between different ways of scoring zero (0). A scoring system counts aces as one point, tens and face cards as zero points and twos through nines as their face value. Any two digit score is equated to the ones digit in the two digit number. For example, a two-card total of 15 results in a value of 5 and a two-card total of 18 results in a value of 8. Next, in one optional play, it is determined if one hand has a higher value than the other 240 (i.e., no tie outcome). After receiving the two cards, the player has an option of receiving only one more playing card. The player may have an option of a double down after his third card is played, (player must take a fourth card if he doubles down) doubling down is not allow on bust hands (that is, hands with a count of at least a hard 12 total, that is a hand where the count is at least 12, without using an Ace as 11) or the ability to split any two cards (they do not have to be a pair), if these options are available in the game. If so, the hand having a value nearest to 0 according to the ranking below is considered the winning hand 250 and corresponding winning wagers are resolved 260 at 1 to 1 or even money and losing and tie wagers are collected. If not, the game results in a tie 270. At step 290, wagers on the tie outcome are paid at 8 to 1 odds. The game outcomes (i.e., winning player's hand, winning dealer's hand or a tie) are displayed 295 on the game display 180. The game display shows ten or more preceding game outcomes thereby allowing players to analyze the data for subsequent wagers.

Hand Ranking (Best to Worst)

Natural 0, 0, 1, 2, 3, 4, 5, 6, 7, 8, 9

A Natural 0 is the first two card count of 0 with a pair. The pair may be two 5's, two tens, two jacks, two queens or two kings.

In these rankings of Pacific Rim Blackjack game, a player or dealer who gets an initial Natural 0 has the highest possible hand and can be tied only by another Natural 0. A regular final hand count of 0 beats all final hand counts of 1-9; a final hand count of 1, beats All final hand counts of 2-9, etc.

In a banker or card club embodiment, a player is designated as a banker/dealer such that the game is played in the herein described manner similar to blackjack. Designating a player as a banker may be accomplished using a high wager, high card, dice, rotation through players or other suitable means. In an alternative game embodiment each player plays against the banker/dealer. In such an embodiment, each player and the banker/dealer receive two cards and the comparison of hand values is conducted individually for each player's hand against the banker's/dealer's hand. Only when a player or a dealer takes the maximum one additional playing card will there be more than two cards in any hand, while continuing to maintain hand values between 0 and 9. This is possible given the scoring system wherein only the one's digit is considered in the hand's final point value.

It is also an option in the play of the present technology to have a player automatically lose the first wager if the first initial total count is 9 or if the player's initial total count is 8 or 9 or the player's initial total count is 7-9 (as house option). This automatic loss will occur irrespective of the dealer/banker initial total count.

Figure 3:
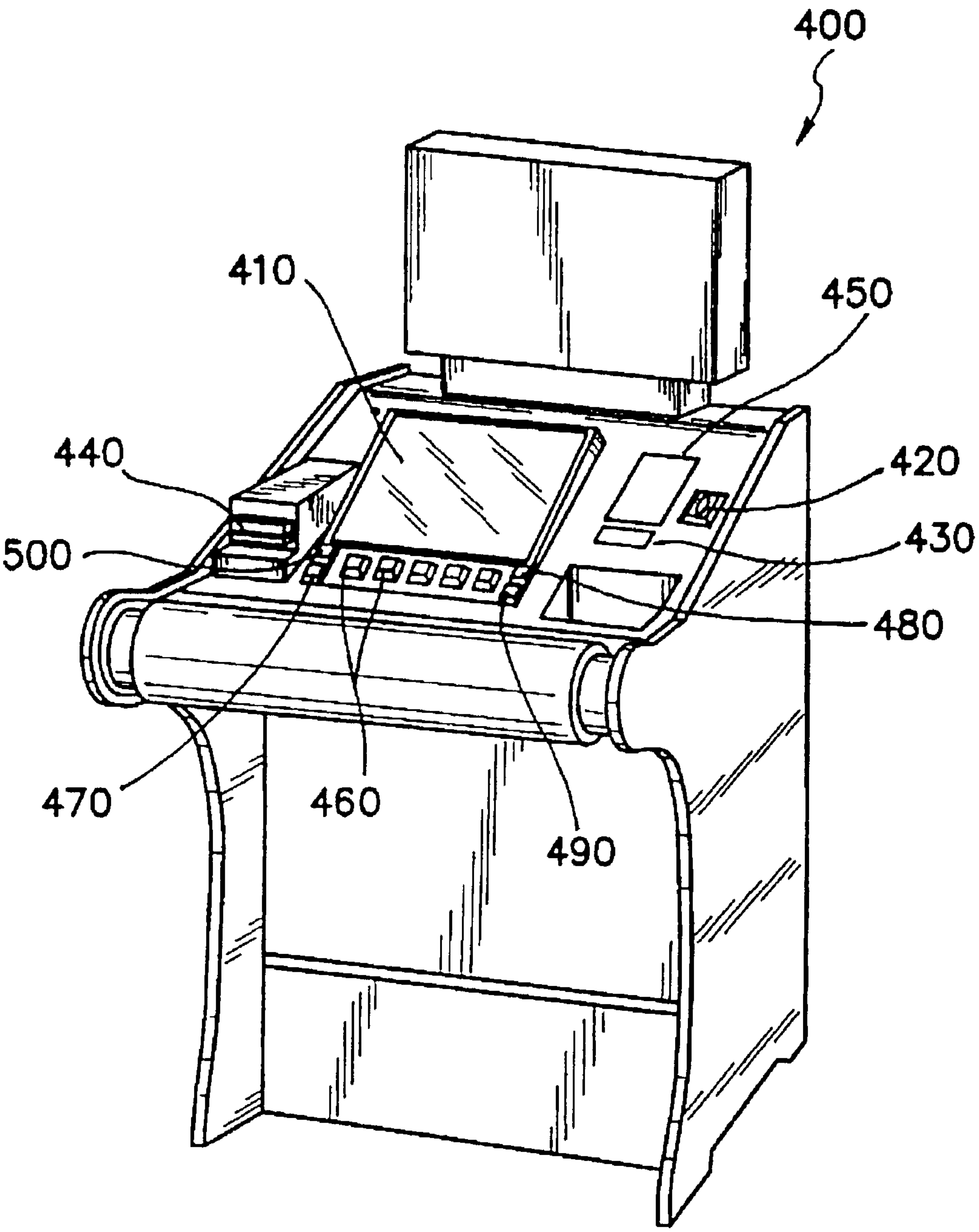
FIG. 3 shows an electronic gaming device for facilitating the embodiments of the present invention.

FIG. 3 shows an electronic gaming device 400 of the type that may facilitate the embodiments of the present invention. The device 400 includes a display 410, coin input 420, bill and/or coupon validator 430, player card reader 440, credit display 450, game operation buttons 460, bet one unit button 470, bet max units button 480, deal button 490 and cash out button 500. Alternatively or additionally, the functions of buttons 460-500 may also be facilitated by touch screen technology.

The operation of electronic gaming devices (e.g., slot machines and video poker machines) is controlled by microprocessors which communicate with internal memory devices and the external features of the device, such as a display panel, player input controls and the like. The microprocessors also incorporate, or communicate with, a random number generator which ensures the randomness of the device's outcomes. In the embodiments of the present invention, one or more processors, along with memory and related devices, control the new applications disclosed herein. Therefore, the embodiments of the present invention, along with the corresponding odds, may be programmed into the processor or associated software. Since the technology for operating and controlling electronic gaming devices is well known to those skilled in the art, the common details are not described herein.

With the electronic gaming device 400, a player places a wager on the player's hand and inputs elections, wager sizes and the like. Payouts for winning wagers and losing wagers are handled by the electronic gaming device processor. A global computer network (e.g., the Internet) may also facilitate play of the embodiments of the present invention.

The practice of the present technology may include a process of performing a wagering game in which:

a) at least one deck of i) standard physical playing cards is provided or ii) at least one deck of virtual playing cards provided by a processor to a video display screen;
b) each player in the game places at least one first wager at risk from each participating player on a player game hand against a banker's/dealer's hand;
c) only two cards are dealt to each designated player and two cards to the banker/dealer such that the designated player and the banker/dealer receive the same number of exactly two cards;
d) each designated player and the dealer examine respective hands to determine in any hand has a Natural 0 count, defined as the first two cards in a hand being a pair of 5's, 10's, jacks, queens or kings;
e) any player versus dealer wagers are resolved between each individual player hand that has a Natural 0 count and between the dealer hand and all player hands where a Natural 0 is present in the dealer hand, while the dealer exposes only a single card to the players;
f) as between each player and the dealer where neither hand has a Natural 0, each player electing to take a maximum of one additional card or declining an additional card and standing pat on the initial two card player hand, while still having seen only one dealer card;

g) the dealer/banker remains pat within a first certain predetermined total counts and is required to take a single hit within a second predetermined total counts, where the first total counts range does not overlap the second total counts range;

h) after all possible additional cards have been dealt, a value of each designated player's hand is compared to a final value of the banker's/dealer's hand wherein said value of the designated player's hand and the banker's/dealer's hand is in a range of zero to nine points based on a pre-established scoring system wherein aces count as one point, tens and face cards count as zero points and all other cards count as their face value and wherein a two-digit hand total is deemed to have a value corresponding to the one's digit of the two-digit total;

i) the first wagers are resolved based on whether the designated player's hand or the banker's/dealer's hand is nearest to a value of 0.

In these methods, exactly two cards are provided to the designated player and the banker/dealer and wherein the player may split any two playing cards by making a second wager on a second split hand, the second wager being exactly equal to the first wager, the player splitting a hand then getting a card to complete a first initial hand, and then playing that first initial hand to conclusion, and then the player splitting a hand receiving a card to complete a second initial hand and then playing that second initial hand to conclusion.

Winning first wagers on the designated player's hand against a dealer/banker hand are resolved at 1 to 1 odds, unless the player has a winning natural 0 count, wherein the player first wager is preferably paid off at a rate between 1.5/1 to 2.0/1. A player having any two cards except for a natural 0 may split the two cards, placing a separate second wager, and the player splitting the two cards playing two hands to conclusion, with a maximum of one additional hit allowed for each of the two player hands after each of the player's two hands has received two initial cards.

In splitting hands, a player may be allowed to split a maximum of three hands, to form a maximum of four hands, the player playing each of the four hands to conclusion, with a maximum of one additional hit allowed for each of the two player hands after each of the player's two hands has received two initial cards.

The method may be facilitated by an electronic gaming device or computer network comprising a processor, memory, stored game rules, accounting functions and having individual player screens for each player and input functions for each player.

Another way of describing some of the methods of this technology of conducting a wagering game is as steps:

a) providing at least one deck of i) physical playing cards or ii) virtual playing cards provided by a processor to a video display screen;

b) accepting at least one first wager from each participating player on a player game hand against a banker's/dealer's hand;

c) dealing only two cards to each designated player and two cards to the banker/dealer such that the designated player and the banker/dealer receive the same number of exactly two cards;

d) each designated player and the dealer examining respective hands to determine in any hand has a Natural 0 count, defined as the first two cards in a hand being a pair of 5's, 10's, jacks, queens or kings;

e) resolving any player versus dealer wagers between each individual player hand that has a Natural 0 count and between the dealer hand and all player hands where a Natural 0 is present in the dealer hand, while the dealer exposes only a single card to the players, wherein the each player not having a Natural 0 loses the first wager against a dealer Natural 0, and each player having a Natural 0 winning at least 1.5/1 against a dealer not having a Natural 0;

f) as between each player and the dealer where neither hand has a Natural 0, each player electing to take a maximum of one additional card or standing pat on the initial two card player hand, while having seen only one dealer card;

g) the dealer/banker remaining pat within a first certain predetermined total counts and being required to take a single hit within a second predetermined total counts, where the first total counts range does not overlap the second total counts range;

h) after all possible additional cards have been dealt, comparing a value of each designated player's hand to a final value of the banker's/dealer's hand wherein said value of the designated player's hand and the banker's/dealer's hand is in a range of zero to nine points based on a pre-established scoring system wherein aces count as one point, tens and face cards count as zero points and all other cards count as their face value and wherein a two-digit hand total is deemed to have a value corresponding to the one's digit of the two-digit total;

i) resolving the wagers based on whether the designated player's hand or the banker's/dealer's hand is nearest to a value of 0.

Although the invention has been described in detail with reference to several embodiments, additional variations and modifications exist within the scope and spirit of the invention as described and defined in the following claims. For example, additional side bets may be made, wagers may be made on specific final hand counts (specific counts or ranges of counts) for the player and/or the dealer/banker, wagers may be made on the spread between player's hands and dealer's hands and the like.

Side Bet 1:

Power Match is a side bet in which the player and dealer must have a match between the dealer's up card and the last digit of the player's first 2 card total. (Example Win: dealer's card 7, the player's cards k-7 or 3-4.) VALUE OF CARDS: 10, J, Q, K have a value of zero, Ace has a value of 1, and all other cards are of face value. A higher payout may be paid if the player wins and all 3 cards match by suit, value or rank.

Example of value: 10-J-K, J-K-K, Q-10-K,

Example of rank: 10-10-10, J-J-J, Q-Q-Q, K-K-K

Game may also be played in the standard game of Blackjack.

Side Bet 2:

Double War is a side bet that uses the player's first 2 cards and the dealer's up card.

If player's lowest ranked card of his 2 cards is higher than the dealer's up card, the player wins a payout of 1 to 1. If the player's lowest ranked card of his 2 cards is lower than the dealer's up card, the player loses. If the player's lowest ranked card of his 2 cards is of the same rank as the dealer's up card the game is a push. If the dealer's up card is a 2 (option 2 and 3) the game is a push. If the dealer's up card rank is an Ace and the player's high card is an Ace, the game is a push. The Player may receive a bonus payout if he beats the dealer's up card, and the player and dealer's card form a straight or straight flush. Game may also be played in the standard game of Blackjack.

Side Bet 3:

Pocket Poker is a side bet that uses the dealer's up card and player's 2nd dealt card. If the player's final 2 card poker hand is a straight or higher, the player wins from a pay table.

PAYING HANDS: Straight pays 2 to 1, Pair pays 3 tol, Straight Flush pays 7 to 1 and Royal Straight Flush pays 10 to 1

House Option: The player's 1st card may also be played with the dealer's card for a separate wager. Game may also be played in the standard game of Blackjack.

Method of play: If Game is played with multiple rounds of play from 1 or more decks dealer will bury 2 or more cards after each round of play to avoid card counting. This method may also be used in the standard game of Blackjack or any other game that card counting is possible.

In the play of the game with physical playing cards, a non-randomized set of cards (which includes a set of one or more decks of cards that has already been used in a game and cards have been at least partially exposed to players) is randomized by manual shuffling or the use of a mechanical shuffler to form a randomized set of playing cards. This transforms a non-usable set of cards (a set of cards in which players might have some actual knowledge of the order of cards which would give them a strategic advantage in the game) into a usable, randomized set of cards This transformed set of playing cards is further transformed from a complete randomized set of cards into subsets of random hands of cards to at least players and usually to players and a dealer. It is only this double transformation of the set of cards that enables the method of the present invention.

Where the term "dealer" is used, that term includes the use of virtual cards by a processor (as the dealer) in playing the game.

The invention claimed is:

1. A method of conducting a wagering game on a video gaming system comprising a processor, a video display and a player input controls comprising:

a) a processor acting as a dealer providing at least one virtual deck of playing cards;

b) the processor recognizing at least one first wager from a player input position participating in a player game hand against a banker's/dealer's hand;

c) the processor dealing only two virtual cards from the virtual set of playing cards to the player input position where a first wager has been recognized and two cards from the virtual set of playing cards to the banker/dealer such that the player input position and the banker/dealer receive the same number of exactly two cards;

d) the processor examining respective hands to determine in any hand has a Natural 0 count from totaling count of the virtual cards, defined as the first two cards in a hand being a pair of 5's, 10's, jacks, queens or kings;

e) the processor resolving any player versus dealer wagers between each individual player input position hand that has a Natural 0 count from totaling the virtual cards and between the dealer hand and all player input position hands where a Natural 0 is present in the dealer hand from totaling the virtual cards, while the dealer exposes only a single virtual card to the player input position, wherein the each player input position not having a Natural 0 loses the first wager against a dealer Natural 0, and each player input position having a Natural 0 winning at least 1.5/1 against a dealer not having a Natural 0;

f) as between each player input position and the dealer where neither hand has a Natural 0, the processor allowing each player input position to elect to take a maximum of one additional card from the virtual set of playing cards or standing pat on the initial two card player hand, while having seen only one dealer card;

g) the processor requiring the dealer/banker remaining pat within a first certain predetermined total counts and being required to take a single hit within a second predetermined total counts, where the first total counts range does not overlap the second total counts range;

h) after all possible additional cards have been dealt from the virtual set of playing cards, the processor comparing a value of each designated player's input position hand to a final value of the banker's/dealer's hand wherein said value of the designated player's input position hand and the banker's/dealer's hand is in a range of zero to nine points based on a pre-established scoring system wherein aces count as one point, tens and face cards count as zero points and all other cards count as their face value and wherein a two-digit hand total is deemed to have a value corresponding to the one's digit of the two-digit total;

i) the dealer resolving the wagers based on whether the designated player's hand or the banker's/dealer's hand is nearest to a value of 0.

2. The method of claim 1 further the processor determining that a player input position automatically loses the first wager if the player's input position initial total hand count is either 9 or is within the range of 8-9 or is in the range of 7-9.

* * * * *